No. 742,289. Patented October 27, 1903.

UNITED STATES PATENT OFFICE.

ALEX CLARKE, OF PARIS, FRANCE.

PROCESS OF OBTAINING CATTLE-FOOD.

SPECIFICATION forming part of Letters Patent No. 742,289, dated October 27, 1903.

Application filed August 4, 1903. Serial No. 168,221. (No specimens.)

*To all whom it may concern:*

Be it known that I, ALEX CLARKE, a subject of the King of Great Britain and Ireland, residing at Paris, department of the Seine, France, (and having post-office address 82 Avenue Henri Martin, in said city,) have invented certain new and useful Improvements in Processes for Obtaining Cattle-Food, of which the following is a specification.

My invention has for its object to provide a process for obtaining a cattle-food in which the phosphoric acid is incorporated so as to be preserved in a solid state without entering into chemical combination with the other elements, so that it can be separated when required as free phosphoric acid and mixed with other foods or dissolved in water.

Hitherto the employment of phosphoric acid for application to fodder has been inconvenient, owing to the caustic syrupy condition in which it is supplied, it being conveyed in carboys or like receptacles, which are fragile and difficult to manage, and this has hitherto restricted the employment of such food.

The food produced according to my invention is in such a condition as to be easily transportable and can be given directly to cattle or the phosphoric acid in a free state can be extracted by simple immersion of the product in water.

I first concentrate the phosphoric acid, having 45° Baume, till it crystallizes, this being effectuated at a low temperature. Then the acid is mixed with peat finely pulverized and which has been before dried during twelve hours in a drying-stove at a temperature of about 40° centigrade. The homogeneous mixture thus obtained contains phosphoric acid in a free state; but it is instable because it sucks up some water. This mixture is dried in a drying-stove at a temperature of about 50° centigrade during twelve hours. I prepare then a mixture of barley and rice (which have been first dried at a temperature of about 40° centigrade and pulverized) in the relative proportions of twenty-five parts, by weight, of rice and seventy-five parts, by weight, of barley. The intimate mixture is dried in a drying-stove at a temperature of about 60° centigrade during twelve hours.
The two mixtures hereinbefore described are then intimately mixed together, some water being added, in the relative proportions of about ten per cent. parts, by weight, till a homogeneous paste is obtained. This paste is dried in a drying-stove at a temperature of about 60° during twelve hours and then again pulverized. The produce thus obtained contains anhydrous acid phosphoric in a free state in the relative proportions of thirty-five per cent. parts, by weight.

By this process the chemical combinations (phosphates) are useless, the product containing acid phosphoric in a free state.

Having thus described the nature of my invention and in what manner the same is to be performed, I declare that what I claim is—

A process for obtaining a cattle-food, consisting of phosphoric acid incorporated in a dry and solid condition with absorbent materials, the phosphoric acid being held in a solid state without entering into chemical combination and being readily recoverable in a free state by first preparing a mixture of peat pulverized and dried with acid phosphoric, and a mixture of rice and barley dried and pulverized, then by intimately mixing these mixtures, and by drying and pulverizing the paste obtained, substantially as hereinbefore described.

In testimony whereof I have hereunto set my hand in presence of two subscribing witnesses.

ALEX CLARKE.

Witnesses:
MAX DE RIDAUD,
AUGUSTUS E. INGRAM.